United States Patent
Wang et al.

(10) Patent No.: US 12,486,190 B2
(45) Date of Patent: Dec. 2, 2025

(54) FINING MOLTEN MATERIAL USING REDUCED PRESSURE

(71) Applicant: Owens-Brockway Glass Container Inc., Perrysburg, OH (US)

(72) Inventors: Zhongming Wang, Ypsilanti, MI (US); Udaya Vempati, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 388 days.

(21) Appl. No.: 17/990,027

(22) Filed: Nov. 18, 2022

(65) Prior Publication Data

US 2024/0166545 A1    May 23, 2024

(51) Int. Cl.
| | |
|---|---|
| C03B 5/225 | (2006.01) |
| C03B 5/02 | (2006.01) |
| C03B 5/033 | (2006.01) |
| C03B 5/20 | (2006.01) |
| C03B 5/235 | (2006.01) |

(52) U.S. Cl.
CPC .............. *C03B 5/2252* (2013.01); *C03B 5/021* (2013.01); *C03B 5/0332* (2013.01); *C03B 5/205* (2013.01); *C03B 5/2257* (2013.01); *C03B 5/2356* (2013.01)

(58) Field of Classification Search
None
See application file for complete search history.

(56) References Cited

U.S. PATENT DOCUMENTS

| | | | |
|---|---|---|---|
| 3,788,832 A | 1/1974 | Nesbitt et al. | |
| 6,119,484 A | 9/2000 | Takei et al. | |
| 6,294,005 B1 | 9/2001 | Inoue et al. | |
| 6,321,572 B1* | 11/2001 | Takei | C03B 5/2252 |
| | | | 65/346 |
| 6,405,564 B1 | 6/2002 | Takei et al. | |
| 2002/0062664 A1 | 5/2002 | Schmitt et al. | |
| 2002/0162358 A1* | 11/2002 | Jeanvoine | C03B 5/2353 |
| | | | 65/135.1 |
| 2011/0088432 A1* | 4/2011 | Purnode | C03B 5/26 |
| | | | 65/181 |
| 2013/0160493 A1 | 6/2013 | Hamamoto et al. | |
| 2014/0033766 A1 | 2/2014 | Maehara et al. | |
| 2019/0284077 A1* | 9/2019 | Wang | C03B 5/2356 |
| 2019/0284078 A1 | 9/2019 | Wang et al. | |

OTHER PUBLICATIONS

PCT Search Report and Written Opinion, Int. Application No. PCT/US2023/078798, Int. Filing Date: Nov. 6, 2023, Applicant: Owens-Brockway Glass Container Inc., Dated: Feb. 5, 2024.

* cited by examiner

*Primary Examiner* — Lisa L Herring

(57) ABSTRACT

A glass fining system, multi-stage vacuum housing, and method are disclosed. The glass fining system includes a multi-stage vacuum housing comprising a first melt receipt tank configured to receive molten material, where the first melt receipt tank is disposed in a first vacuum chamber; a first refining channel configured to flow the molten material from the first melt receipt tank through a second vacuum chamber; a second melt receipt tank configured to receive the molten material from the first refining channel, where the second melt receipt tank is disposed in a third vacuum chamber; and a second refining channel configured to flow the molten material from the second melt receipt tank and through a fourth vacuum chamber; and a glass melter coupled to the multi-stage vacuum housing.

21 Claims, 2 Drawing Sheets

FINING MOLTEN MATERIAL USING REDUCED PRESSURE

TECHNICAL FIELD

The present disclosure is directed to processing of molten material, and more particularly, to fining molten glass.

BACKGROUND

Submerged combustion melting ("SCM") is a type of melting used in glass manufacturing in which a combustible mixture of a fuel and an oxidant is fired directly into and under the surface of a glass melt in which glass-forming materials are being melted. The contact between the glass melt and the combustion gases supports high rates of mass and heat transfer. During this process, however, the combustion gases and other gases generated from the melting reactions may form gas bubbles within the glass melt. These bubbles often need to be removed from molten glass pulled from the glass melt so that the discharged molten glass can be further processed into a glass article. The process of removing gas bubbles from molten glass is referred to as fining or refining.

SUMMARY OF THE DISCLOSURE

The present disclosure embodies a number of aspects that can be implemented separately from or in combination with each other.

A multi-stage vacuum housing, in accordance with one aspect of the disclosure, includes a first melt receipt tank configured to receive molten material, where the first melt receipt tank is disposed in a first vacuum chamber; a first refining channel configured to flow the molten material from the first melt receipt tank through a second vacuum chamber; a second melt receipt tank configured to receive the molten material from the first refining channel, where the second melt receipt tank is disposed in a third vacuum chamber; and a second refining channel configured to flow the molten material from the second melt receipt tank and through a fourth vacuum chamber.

A glass fining system, in accordance with one aspect of the disclosure, includes a multi-stage vacuum housing comprising a first melt receipt tank configured to receive molten material, where the first melt receipt tank is disposed in a first vacuum chamber; a first refining channel configured to flow the molten material from the first melt receipt tank through a second vacuum chamber; a second melt receipt tank configured to receive the molten material from the first refining channel, where the second melt receipt tank is disposed in a third vacuum chamber; and a second refining channel configured to flow the molten material from the second melt receipt tank and through a fourth vacuum chamber; and a glass melter coupled to the multi-stage vacuum housing.

A method for fining molten glass, in accordance with one aspect of the disclosure, includes melting a solid material in a melter to produce molten material; streaming the molten material from the melter to a first melt receipt tank in a first vacuum chamber; flowing the molten material from the first melt receipt tank through a second vacuum chamber to a second melt receipt tank in a third vacuum chamber; and flowing the molten material from the second melt receipt tank through a fourth vacuum chamber.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

Figure 1:
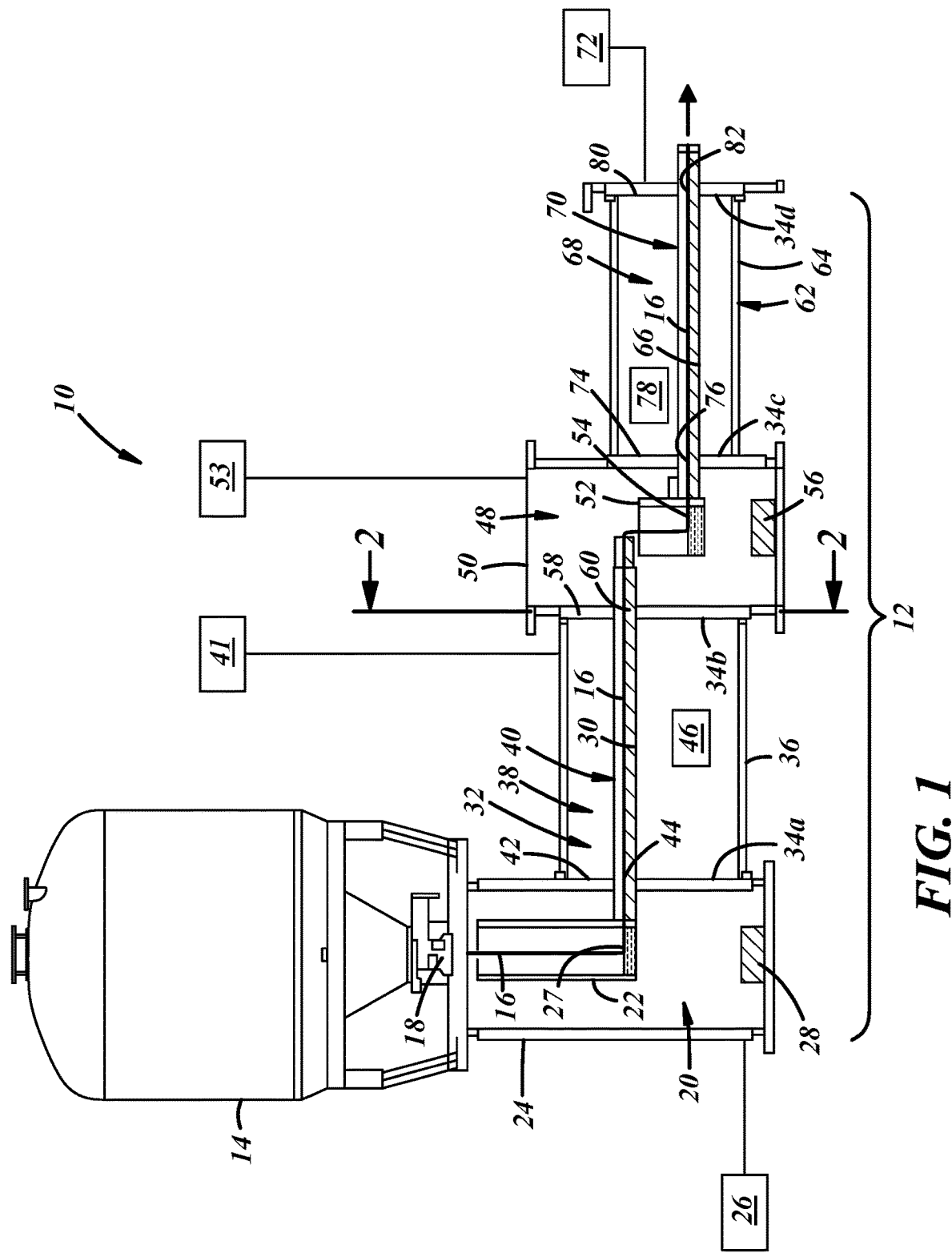
FIG. 1 is a schematic fragmentary view illustrating a glass fining system including a multi-stage vacuum housing coupled to a glass melter in accordance with an illustrative embodiment of the present disclosure.

In accordance with at least one aspect of the disclosure, a housing, a system, and a method are provided for fining molten glass using multiple glass melt receipt tanks and multiple vacuum chambers.

The SCM melting method can suffer from excessive gas bubbling, which can cause difficulties in glass manufacturing. Due to the combustion gases, the molten glass discharged from a submerged combustion melter can have high amounts of trapped gases that are slow to escape using traditional refining techniques. These entrained gas bubbles may need to be removed prior to forming the glass into the desired product shape. The technique and equipment discussed herein may be used to refine molten glass that has been produced by SCM melting or any other melting method. By using a series of refining chambers with reduced pressure as disclosed herein, a very low reduced pressure may be achieved, which can quickly remove entrained gas bubbles from the molten glass. The low reduced pressure that is used in the disclosed system may not be achievable in a single stage refining chamber because a steep reduction to a very low reduced pressure can cause intense foaming of the glass.

One method for removing gas bubbles from molten glass is refractory channel thermal fining. However, thermal fining often requires a long time for the bubbles to effectively rise to the surface of the molten glass and break. Additionally, refractory channel thermal fining without vacuum can require an expensive refractory structure, which, during extended operation, can easily wear out, require high maintenance, and lack flexibility. Plus, the thermal fining channel can occupy a large footprint and valuable manufacturing space and may not have on/off functionality that matches the flexibility of a submerged combustion melter. Another method for removing gas bubbles from molten glass utilizes a fining chamber under vacuum to fine molten glass from the melter. However, the materials used to construct a reduced pressure fining chamber may not be designed to be resistant to both corrosive molten glass and a low-pressure environment.

The present disclosure is directed to a housing, system, and method to fine molten glass by flowing the molten glass through multiple vacuum chambers. By using the housing, system, and method described herein, corrosive-resistant materials can be used in the melt receipt tanks, while low-pressure resistant materials can be used in the vacuum chambers. The molten glass can be received from a melter in a melt receipt tank, which can be resistant to the corrosiveness of the molten glass. The molten glass can also flow through multiple vacuum chambers, which can be configured to withstand reduced air pressure. The high temperature of the molten glass and the reduced pressure within the vacuum chambers can better facilitate efficient fining since the gas bubbles can be more easily grown and evolved from the glass due to the low viscosity of the heated molten glass and the low-pressure environment of the vacuum chamber. As used herein, the term "low viscosity," regardless of where the glass is present in the system, refers to a viscosity between 100 poise and 1000 poise. In some instances, the housing, system, and method can also provide for laminar or thin layer molten glass flow in addition to low viscosity glass, which can further enhance fining. A "thin layer" for purposes of "thin layer fining (or refining)," as those terms are used throughout this description, refers to flowing the molten glass in a layer having a thickness ranging from three inches to twelve inches.

Referring generally to FIG. 1, a glass fining system 10 and a multi-stage vacuum housing 12 are illustrated in accordance with illustrative embodiments of the present disclosure. The glass fining system 10 and multi-stage vacuum housing 12 may be configured to fine molten glass or other molten material from a glass melter 14 or other type of melter (e.g., metal furnace) by removing gas bubbles formed during the melting process.

As illustrated in FIG. 1, the glass melter 14 may be configured to melt glass-forming materials and to provide molten glass 16 downstream to the multi-stage vacuum housing 12. The glass melter 14 may include, for example, a submerged combustion melter. During glass melting, a combustible mixture of a fuel such as methane or propane and an oxidant such as pure oxygen or air is fired into the submerged combustion melter directly into and under the surface of a glass melt contained therein while the glass-forming materials are being introduced into the glass melt. The temperature of the glass melt within the submerged combustion melter typically ranges from 1250° C. to 1400° C., and the combustion gases created during combustion of the combustible gas mixture introduces a large amount of gas bubbles in the molten glass 16 being discharged from the glass melter 14. The glass melter 14 may include a variety of suitable types of glass melters other than or in addition to a submerged combustion melter. The molten glass 16 may exit the glass melter 14 by way of a spout 18 located at a downstream end of the glass melter 14. The spout 18 may include, for example, a heated orifice device used to control flow of and/or provide heat to the molten glass 16. The spout 18 may be configured to provide a flow of molten glass 16 from the glass melter 14 that may be columnar, laminar, or the like.

The glass fining system 10 may include the multi-stage vacuum housing 12 coupled to the glass melter 14. The multi-stage vacuum housing 12 may be configured to receive the molten glass 16 from the glass melter 14 and to fine the molten glass 16 in multiple stages using reduced pressure.

The multi-stage vacuum housing 12 may include a first vacuum chamber 20, which can provide an enclosed space where molten glass 16 from the glass melter 14 is received. The first vacuum chamber 20 may include a first melt receipt tank 22 and a first housing 24 that surrounds at least part of the first melt receipt tank 22 to maintain a vacuum or reduced pressure within the first vacuum chamber 20. In an example, the pressure within the first vacuum chamber 20 may be between 50 torr and 450 torr or, more narrowly, between 100 torr and 300 torr. The first vacuum chamber 20 may be similar to the low-pressure chamber described in U.S. Pat. No. 11,339,077, the entire content of which is hereby incorporated by reference.

The first housing 24 may insulate the first melt receipt tank 22 to maintain the temperature of the molten glass 16 and, in turn, facilitate low viscosity for efficient fining of the molten glass 16. The first housing 24 may include a metal housing. In some embodiments, the first housing 24 may include, be coupled to, and/or be in fluid communication with a vacuum source 26 for providing vacuum to the first vacuum chamber 20. The vacuum can increase fining efficiency by increasing the size of the gas bubbles within the molten glass 16, especially in combination with the low viscosity of the molten glass 16 facilitated by maintaining the glass at an elevated temperature as indicated below.

The first melt receipt tank 22 may be positioned to receive the flow of the molten glass 16 directly from the spout 18, which can extend into the first vacuum chamber 20 and/or through the first housing 24. In some instances, the first melt receipt tank 22 may include or may be coupled to a refractory or collecting funnel (not shown) that is situated along a flow path of the molten glass 16. The first melt receipt tank 22 may be formed from materials that are resistant to the corrosiveness of the molten glass 16. For example, the first melt receipt tank 22 may include refractory and/or another suitable corrosion resistant material. The molten glass 16 is preferably received in the first melt receipt tank 22 at a temperature ranging from 1290° C. to 1330° C.

The first melt receipt tank 22 and/or the first vacuum chamber 20 may include at least one surface extender 27. The surface extender 27 may include at least one objective (e.g., a pole, a ball or sphere, a cylinder, a wall, a box, a polyhedron, and the like) and/or any smooth surface or structure disposed in the path of the molten glass 16. The at least one surface extender can comprise a material that is resistant to high temperature and/or corrosion (e.g., a refractory material, niobium, molybdenum, tantalum, tungsten, rhenium, and the like) and can serve to distribute the molten glass 16 into a thin layer to increase the residence time and/or surface area of the glass. The thin layer, low pressure, and increased residence time of the molten glass 16 may combine to facilitate more efficient fining due to a less viscous molten glass stream, larger bubbles due to the reduced pressure, and greater fining speed due to the molten glass 16 having an increased surface area and less depth through which the bubbles must ascend. In some embodiments, the at least one surface extender 27 may be declined relative to an axis that is parallel with flow of the molten glass 16 from the glass melter 14. The surface extender 27 may be similar to the surface extender described in U.S. Pat. No. 11,339,077 and the objective described in U.S. Pat. No. 11,319,236. The entireties of both of the aforementioned documents are incorporated herein by reference.

The first vacuum chamber 20 may include a first tank heater 28. The first tank heater 28 may be positioned and configured to provide heat to the molten glass 16 within the first vacuum chamber 20 and/or the first melt receipt tank 22, if needed, to raise or help maintain the temperature of the glass as it enters and passes through the first melt receipt tank 22. Some examples of a first tank heater 28 may include an electric resistive heater and/or an induction heater, although other suitable heaters may also be utilized.

The multi-stage vacuum housing 12 may include a first refining channel 30 configured to flow the molten glass 16 from the first melt receipt tank 22 through a second vacuum chamber 32. The first refining channel 30 may include a trough, channel, or other suitable conduit extending through the second vacuum chamber 32 for flowing the molten glass 16 and may be at least partially supported by at least one wall 34a, 34b, which may extend from the first refining channel 30 downwardly to a second housing 36 and at least partially create a pressure seal for the second vacuum chamber 32. The first refining channel 30 may be formed of a material that is resistant to corrosion from the molten glass 16 such as, for example, a refractory. The second housing 36 may be formed of material (e.g., metal) able to withstand reduced pressure or vacuum in the second vacuum chamber 32.

The second vacuum chamber 32 may be coupled to and/or abut the first vacuum chamber 20 and may include the second housing 36 that encloses at least a portion of the first refining channel 30 and an air gap 38. The air gap 38 may be disposed between the second housing 36 and the first refining channel 30 and/or may be disposed cross-sectionally surrounding the first refining channel 30. In the example illustrated in FIG. 1, the second vacuum chamber 32 is shown extending horizontally with respect to gravity from the first vacuum chamber 20. In other instances, the second vacuum chamber 32 may be positioned in a cascading or vertically offset configuration from the first vacuum chamber 20. Within the second vacuum chamber 32, the molten glass 16 preferably flows along the first refining channel 30 at a temperature ranging from 1270° C. to 1310° C.

The first refining channel 30 may have an open top 40 and be exposed to the air gap 38. A vacuum source 41 (e.g., a vacuum pump) may be coupled to the second vacuum chamber 32 and can provide a vacuum (e.g., a pressure of 50 torr to 450 torr or, more narrowly, a pressure of 100 torr to 300 torr) to the second vacuum chamber 32 and/or the air gap 38. Because the first refining channel 30 can include the open top 40, molten glass 16 flowing within the first refining channel 30 can be exposed to the reduced pressure of the air gap 38, which can cause bubbles within the molten glass 16 to become larger and escape from the molten glass 16 at a faster rate than they otherwise would, thus enhancing the fining of the molten glass 16.

The second vacuum chamber 32 may include a first skimmer 42. For example, the first skimmer 42 may be positioned between the second vacuum chamber 32 and the first housing 24, and contacts the molten glass 16 in the first refining channel 30. The first skimmer 42 may be formed of a refractory material for contacting the molten glass 16 and may extend downwardly from the second housing 36 and be configured to be partially submerged in the molten glass 16. The first skimmer 42 and the first refining channel 30 can define a first submerged passageway 44 through which an undercurrent of the molten glass 16 in the first refining channel 30 can flow. Because the first skimmer 42 is partially submerged in the molten glass 16 and extends from the molten glass 16 to the second housing 36, the first skimmer 42 and the first refining channel 30 can form an air pressure seal, in combination with the wall 34a, between the first vacuum chamber 20 and the second vacuum chamber 32, thus enabling different pressures in each chamber. Other suitable structures may also be used for creating an air pressure seal between respective vacuum chambers including, for example, a permanent wall disposed between the molten glass 16 and a respective vacuum chamber.

The second vacuum chamber 32 may receive heat from a heat source 46. The heat source 46 may be disposed proximate to the first refining channel 30 (e.g., above, below, and the like) and can provide heat for controlling and maintaining the temperature of the molten glass 16 flowing in the first refining channel 30. Controlling and maintaining the temperature of the molten glass 16 can lower or maintain a low viscosity of the molten glass 16 and, thus, enhance fining by increasing the rate at which bubbles ascend through and escape the molten glass 16 in the first refining channel 30. Some examples of the heat source 46 include a resistive heater and/or an induction heater.

The multi-stage vacuum housing 12 may also include a third vacuum chamber 48. The third vacuum chamber 48 may be coupled to and/or abut the second vacuum chamber 32 and may include a third housing 50. The third housing 50 forms an enclosed space that encloses a second melt receipt tank 52 and a portion of the first refining channel 30. The third housing 50 may include a metal housing. A vacuum source 53 (e.g., a vacuum pump) may be coupled to and provide vacuum to the third vacuum chamber 48. The third vacuum chamber 48 may be operated at a reduced pressure or a vacuum to facilitate fining of the molten glass 16. For example, the pressure in the third vacuum chamber 48 may be between 50 torr to 400 torr or, more narrowly, between 100 torr and 300 torr. The first refining channel 30 may extend from within the second vacuum chamber 32 and into the third vacuum chamber 48 to flow the molten glass 16 into the second melt receipt tank 52. The second melt receipt tank 52 may be positioned to receive the molten glass 16 from the first refining channel 30, which may include laminar molten glass flow into the second melt receipt tank 52. The second melt receipt tank 52 may be formed of a corrosion resistant material such as, for example, refractory. The molten glass 16 is preferably received in the second melt receipt tank 52 at a temperature ranging from 1250° C. to 1290° C.

The second melt receipt tank 52 and/or the third vacuum chamber 48 may include at least one surface extender 54. The surface extender 54 may include at least one objective (e.g., a pole, a ball or sphere, a cylinder, a wall, a box, a polyhedron, and the like) and/or any smooth surface or structure disposed in the path of the molten glass 16. The at least one surface extender 54 may comprise a material that is resistant to high temperature and/or corrosion (e.g., a refractory material, niobium, molybdenum, tantalum, tungsten, rhenium, and the like) and can serve to distribute the molten glass 16 into a thin layer on the surface extender 54 to increase the residence time and/or surface area of the glass. The thin layer, low pressure, and increased residence time of the molten glass 16 may combine to facilitate more efficient fining due to a less viscous molten glass stream, larger bubbles due to the reduced pressure, and greater fining speed due to the molten glass 16 having an increased surface area and less depth through which the bubbles must ascend. In the example shown in FIG. 1, the second melt receipt tank 52 can include the surface extender 54 in the form of a wall.

The third vacuum chamber 48 may include a third tank heater 56. The third tank heater 56 may be positioned and configured to provide heat to the molten glass 16 within the third vacuum chamber 48 and/or the second melt receipt tank 52, if needed, to raise or help maintain the temperature of the glass as it enters and passes through the second melt receipt tank 52. Some examples of a third tank heater 56 may include an electric resistive heater and/or an induction heater, although other suitable heaters may also be utilized.

A second skimmer 58 may be positioned between the second vacuum chamber 32 and the third vacuum chamber 48 and may contact the molten glass 16 in the first refining channel 30. The second skimmer 58 may be formed of a refractory material for contacting the molten glass 16 and may extend downwardly from the second housing 36 and/or the third housing 50 and be partially submerged in the molten glass 16 in the first refining channel 30. The second skimmer 58 and the first refining channel 30 may define a second submerged passageway 60 through which an undercurrent of the molten glass 16 in the first refining channel 30 can flow. Because the second skimmer 58 is submerged in the molten glass 16 within the first refining channel 30, the second skimmer 58 and the first refining channel 30 can form an air pressure seal, in combination with the wall 34b, between a third vacuum chamber 48 and the second vacuum chamber 32 so that pressure within the second vacuum chamber 32 and/or the third vacuum chamber 48 may be controlled, reduced pressure may be maintained, and different pressures in each chamber 32, 48 may be obtained.

The multi-stage vacuum housing 12 may include a fourth vacuum chamber 62 that may be coupled to and/or abut the third vacuum chamber 48. The fourth vacuum chamber 62 may include a fourth housing 64 that defines an enclosed space and encloses at least a portion of a second refining channel 66 and a second air gap 68. The second air gap 68 may be disposed between the fourth housing 64 and the second refining channel 66 and/or may be disposed cross-sectionally surrounding the second refining channel 66. The fourth housing 64 may be formed of material (e.g., metal) able to withstand reduced pressure or vacuum in the fourth vacuum chamber 62.

The second refining channel 66 may receive molten glass 16 from the second melt receipt tank 52 and may extend into and through the fourth vacuum chamber 62. The second refining channel 66 may include a trough, channel, or other suitable conduit extending through the fourth vacuum chamber 62 for flowing the molten glass 16 and may be at least partially supported by at least one wall 34c, 34d, which may extend from the second refining channel 66 downwardly to the fourth housing 64. The at least one wall 34c, 34d can at least partially create a pressure seal for the fourth vacuum chamber 62. Additionally, the second refining channel 66 may have an open top 70 so that molten glass 16 in the second refining channel 66 may be exposed to the second air gap 68. Within the fourth vacuum chamber 62, the molten glass 16 preferably flows along the second refining channel 66 at a temperature ranging from 1230° C. to 1270° C.

A vacuum source 72 (e.g., a vacuum pump) may be coupled to and provide vacuum (e.g., a pressure of 50 torr to 400 torr or, more narrowly, a pressure of 100 torr to 300 torr) to the fourth vacuum chamber 62. While separate vacuum sources 26, 41, 53, and 72 are coupled to separate vacuum chambers 20, 32, 48, 62 in the embodiment shown, the glass fining system 10 may include less or different combinations of vacuum sources such as, for example, one vacuum source for the tank chambers 20, 48 and one vacuum source for the vacuum chambers 32, 62. Because the second refining channel 66 may include the open top 70, molten glass 16 flowing within the second refining channel 66 may be exposed to the reduced pressure of the air gap 68 and the fourth vacuum chamber 62, which can cause bubbles within the molten glass 16 to become larger and escape from the molten glass 16 at a faster rate than they otherwise would, thus enhancing the fining of the molten glass 16.

A third skimmer 74 may be positioned between the third vacuum chamber 48 and the fourth vacuum chamber 62. The third skimmer 74 may be formed of a refractory material and may extend downwardly from the third housing 50 and/or the fourth housing 64 and be partially submerged in the molten glass 16 in the second refining channel 66. The third skimmer 74 and the second refining channel 66 may define a third submerged passageway 76 through which an undercurrent of the molten glass 16 can flow. Because the third skimmer 74 is submerged in the molten glass 16, the third skimmer 74 and the second refining channel 66, in combination with the wall 34c, can create an air pressure seal between the third vacuum chamber 48 and the fourth vacuum chamber 62 so that pressure within the third vacuum chamber 48 may be controlled, a reduced pressure may be maintained, and different pressures in the chambers 48, 62 may be obtained.

The fourth vacuum chamber 62 may receive heat from a heat source 78. The heat source 78 may be disposed proximate to the second refining channel 66 (e.g., above, below, and the like) and can provide heat for controlling and maintaining the temperature of the molten glass 16 in the second refining channel 66. Controlling and maintaining the temperature of the molten glass 16 can lower or maintain a low viscosity of the molten glass 16 and, thus, enhance fining by increasing the rate at which bubbles ascend through and escape the molten glass 16. Some examples of the heat source 78 include a resistive and/or an induction heater.

A fourth skimmer 80 may extend downwardly from the fourth housing 64 downstream of the third skimmer 74 and may be partially submerged in the molten glass 16 in the second refining channel 66. The fourth skimmer 80 may be formed of a refractory material. The fourth skimmer 80 and the second refining channel 66 may define a fourth submerged passageway 82 through which an undercurrent of the molten glass 16 can flow. Because the fourth skimmer 80 is submerged in the molten glass 16, the fourth skimmer 80 and the second refining channel 66, in combination with the wall 34d, can create an air pressure seal for the fourth vacuum chamber 62 to control and maintain a reduced pressure in the fourth vacuum chamber 62 and allow different pressures to be maintained in the third and fourth vacuum chambers 48, 62.

As the molten glass 16 flows from the glass melter 14 through the first melt receipt tank 22, the first refining channel 30, the second melt receipt tank 52, and the second refining channel 66, the glass fining system 10 may be configured to facilitate thin layer refining of the molten glass 16. Thin layer refining, as discussed above, refers to flowing the molten glass 16 in a layer ranging between three inches and twelve inches thick to increase fining efficacy by reducing the depth of glass through which bubbles must ascend. Thin layer refining may be achieved, for example, by controlling the flow rate of the molten glass 16 and maintaining the temperature of the molten glass 16 to provide a low viscosity flow of molten glass 16 through the vacuum chambers 20, 32, 48, 62 in a thin layer.

The molten glass 16 may spend a time or duration in each vacuum chamber 20, 32, 48, 62 as it flows through the multi-stage vacuum housing 12. For example, the molten glass 16 may spend about five minutes to about sixty minutes in each of the vacuum chambers 20, 32, 48, 62. The time spent in each vacuum chamber 20, 32, 48, 62 may be adjusted by adjusting flow rate of the molten glass 16 and/or adjusting the size or slope of the first refining channel 30 or the second refining channel 66. The exact time spent in each vacuum chambers 20, 32, 48, 62 can be tailored to ensure that sufficient gas bubbles are evolved from the molten glass 16 prior to the molten glass being received in the next succeeding vacuum chamber.

The first vacuum chamber 20, the second vacuum chamber 32, the third vacuum chamber 48, and the fourth vacuum chamber 62 may be configured for a sequential reduction in reduced pressure; that is, the pressure may be reduced in each subsequent chamber to reduce the gas bubble content in each subsequent portion of the molten glass 16. For example, the vacuum in the second vacuum chamber 32 may be less than the vacuum in the first vacuum chamber 20, and the vacuum in the fourth vacuum chamber 62 may be less than the pressure in the third vacuum chamber 48, which may be less than the pressure in the second vacuum chamber 32. At each reduction in pressure in subsequent vacuum chambers 20, 32, 48, 62, the volume of the trapped gases within the molten glass 16 expands, allowing the resulting bubbles to more quickly rise to a surface of the molten glass 16 and escape. With each reduction in pressure at each vacuum chamber, the molten glass 16 contains fewer and fewer gaseous bubbles. By using the sequential reduction in pressure, the vacuum chambers 20, 32, 48, 62 may operate at lower temperatures than traditional refiners.

Figure 2:
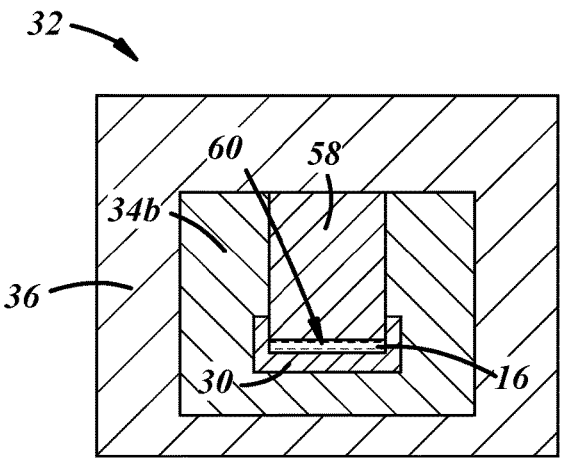
FIG. 2 is a schematic cross-sectional view illustrating a refining channel in the multi-stage vacuum housing along section lines 2-2 illustrated in FIG. 1 in accordance with an illustrative embodiment of the present disclosure.

FIG. 2 illustrates a cross-sectional view of the second vacuum chamber 32 along section lines 2-2 shown in FIG. 1. The second vacuum chamber 32 includes the second housing 36 and the first refining channel 30 extending therethrough. The first refining channel 30 is shown at least partially surrounded and/or supported by wall 34b, and the second skimmer 58 is shown extending downwardly from the second housing 36 into the molten glass 16 within the first refining channel 30. The first refining channel 30 and the second skimmer 58 define the second submerged passageway 60 through which the molten glass 16 can flow. The wall 34b, the second skimmer 58, the first refining channel 30, and the flowing molten glass 16 can form a pressure seal. This pressure seal, in combination with another pressure seal formed by wall 34a, the first skimmer 42, the first refining channel 30, and the flowing molten glass 16, permits a reduced pressure to be maintained within the second vacuum chamber 32. Similar pressure seals may be formed for the other vacuum chambers 20, 48, 62.

Figure 3:
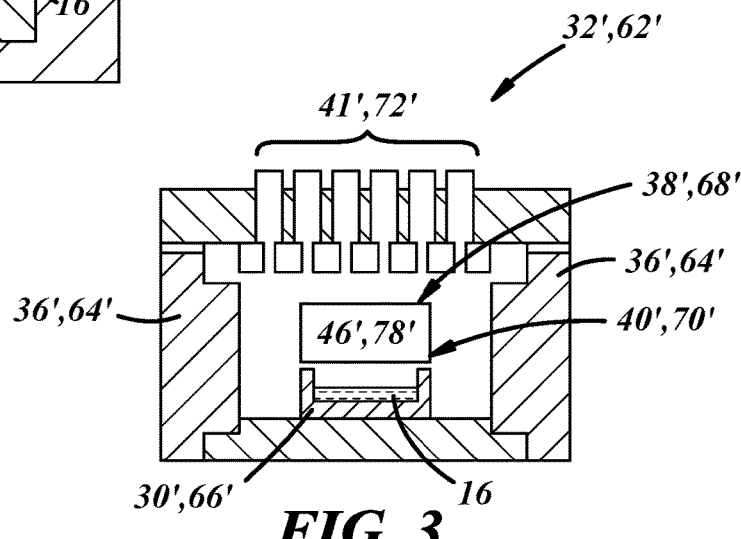
FIG. 3 is a schematic cross-sectional view illustrating a refining channel in the multi-stage vacuum housing illustrated in FIG. 1 in accordance with another illustrative embodiment of the present disclosure.

FIG. 3 illustrates a cross-sectional view of another example of a vacuum chamber 32', 62' with a refining channel 30', 66' extending through the vacuum chamber 32', 62' and supported by a portion of a chamber housing 36', 64'. In the view shown in FIG. 3, the vacuum chamber 32', 62' may include the chamber housing 36', 64', the refining channel 30', 66' including an open top 40', 70' and extending through the vacuum chamber 32', 62', a heat source 46', 78' positioned proximate to the refining channel 30', 66', and an air gap 38', 68' disposed between the refining channel 30', 66' and the chamber housing 36', 64'. The vacuum source 41', 72' can provide a reduced pressure or vacuum to the vacuum chamber 32', 62'. The refining channel 30', 66' may be supported by other suitable structure or may be supported in only some locations.

Figure 4:
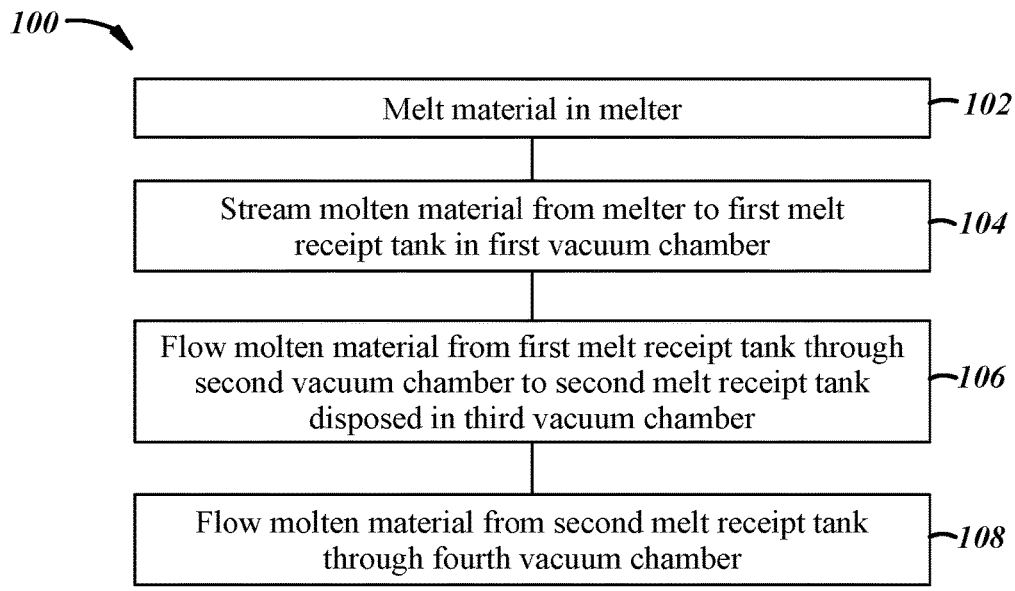
FIG. 4 is a flow diagram showing various steps of an illustrative embodiment of a method for fining glass using the glass fining system and the multi-stage vacuum housing described herein.

FIG. 4 illustrates an example of a method 100 for fining molten glass using the glass fining system 10 and the multi-stage vacuum housing 12. For purposes of illustration, the method 100 will be described in the context of the glass fining system 10 described above and illustrated in FIG. 1. The application of the present methodology is not meant to be limited solely to the arrangement and structure depicted in FIG. 1; rather the method 100 may find application with any number of arrangements in that the various steps of the method 100 may be performed by components or arrangements of the glass fining system 10 other than those described above and below.

The method 100 comprises a step 102 of melting glass in the glass melter 14 to produce the molten glass 16 discharged from the melter 14. This may involve melting a batch of glass-forming materials, which may include raw materials and recycled glass, in a submerged combustion melter as described above. Next, the method 100 comprises a step 104 of streaming the molten glass 16 from the glass melter 14 to the first melt receipt tank 22 in the first vacuum chamber 20. In one implementation, streaming the molten glass 16 may include using the spout 18 to direct the molten glass 16 into to the first melt receipt tank 22, optionally onto the surface extender 27. In some instances, the spout 18 may be configured to flow a laminar stream of molten glass 16. Additionally, streaming the molten glass 16 may include controlling the desired temperature and/or heat transfer rate of the molten glass 16 by heating the spout 18 using, for example, a heated orifice.

The method 100 also includes a step 106 of flowing the molten glass 16 from the first melt receipt tank 22 through the second vacuum chamber 32 to the second melt receipt tank 52 in the third vacuum chamber 48. Flowing the molten glass 16 may include using the first refining channel 30 to receive, flow, and deliver the molten glass 16 to the second melt receipt tank 52. The molten glass flow rate may be controlled to facilitate thin layer fining within the first refining channel 30, for example, by heating the molten glass 16 and/or slowing the molten glass flow rate so that a thickness of the molten glass 16 achieves a predetermined thickness in which the molten glass 16 has a low viscosity. The low viscosity during the thin layer fining enhances migration of the gas bubbles through and from the molten glass 16 while the molten glass 16 flows through the first refining channel 30. Moreover, flowing the molten glass 16 into and through the second vacuum chamber 32 can facilitate the migration and release of gas bubbles from the molten glass 16 because the reduced pressure within the second vacuum chamber 32 helps the bubbles grow in size, thus causing gas bubbles to escape from the molten glass 16 at a faster rate.

The method 100 further includes a step 108 of flowing the molten glass 16 from the second melt receipt tank 52 through the fourth vacuum chamber 62. Flowing the molten glass 16 through the fourth vacuum chamber 62 may include using the second refining channel 66 to receive and direct the flow of the molten glass 16 from the second melt receipt tank 52. As in step 106, step 108 may include controlling flow rate of the molten glass 16 within the second refining channel 66 to facilitate thin layer fining. The flowing molten glass 16 in the second refining channel 66 may also be heated using the heat source 78. Subsequent to flowing the molten glass 16 through the fourth vacuum chamber 62, the molten glass can flow downstream to other process steps such as glass container forming equipment.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments for expedience. The disclosure is intended to embrace all such modifications and variations as fall within the spirit and broad scope of the appended claims.

The invention claimed is:

1. A multi-stage vacuum housing, comprising:
   a first melt receipt tank configured to receive molten material, where the first melt receipt tank is disposed in a first vacuum chamber;
   a first refining channel configured to flow the molten material from the first melt receipt tank through a second vacuum chamber;

a second melt receipt tank configured to receive the molten material from the first refining channel, where the second melt receipt tank is disposed in a third vacuum chamber; and a second refining channel configured to flow the molten material from the second melt receipt tank and through a fourth vacuum chamber, wherein the first vacuum chamber is pressure sealed from the first melt receipt tank and the second melt receipt tank, and the second vacuum chamber is pressure sealed from the second melt receipt tank.

2. The multi-stage vacuum housing in claim 1, wherein the molten material comprises molten glass.

3. The multi-stage vacuum housing in claim 1, wherein the molten material flows laminarly into the first melt receipt tank.

4. The multi-stage vacuum housing in claim 1, wherein at least one of the first melt receipt tank or the second melt receipt tank is heated.

5. The multi-stage vacuum housing in claim 1, wherein at least one of the first refining channel or the second refining channel has an open top.

6. The multi-stage vacuum housing in claim 1, wherein at least one of the first refining channel or the second refining channel includes a refractory material.

7. The multi-stage vacuum housing in claim 1, wherein an air gap is disposed between at least one of the first refining channel and a second housing or the second refining channel and a fourth housing.

8. The multi-stage vacuum housing in claim 1, wherein at least one of the first vacuum chamber or the second vacuum chamber includes a heat source.

9. The multi-stage vacuum housing in claim 8, wherein the heat source includes at least one of an induction heater or an electric resistive heater.

10. The multi-stage vacuum housing in claim 1, wherein at least one of the first melt receipt tank, the first vacuum chamber, the second melt receipt tank, or the second vacuum chamber is at a pressure less than atmospheric pressure.

11. The multi-stage vacuum housing in claim 1, wherein pressure in the first vacuum chamber is different than pressure in the second vacuum chamber.

12. The multi-stage vacuum housing in claim 1, wherein at least one of the first refining channel or the second refining channel is configured for thin layer melting.

13. The multi-stage vacuum housing in claim 1, further comprising:
at least one skimmer disposed between molten material in at least one of the first refining channel or the second refining channel and a second housing or a fourth housing.

14. The multi-stage vacuum housing in claim 1, further comprising:
at least one vacuum source coupled to the multi-stage vacuum housing.

15. A glass fining system, comprising:
the multi-stage vacuum housing of claim 1; and
a melter coupled to the multi-stage vacuum housing.

16. The glass fining system in claim 15, wherein the glass melter includes a submerged combustion melter.

17. The multi-stage vacuum housing in claim 1, further comprising:
a first skimmer configured to contact the molten material in the first refining channel to pressure seal the first vacuum chamber from the second vacuum chamber; and
a second skimmer configured to contact the molten material in the first refining channel to pressure seal the second vacuum chamber from the third vacuum chamber.

18. The multi-stage vacuum housing in claim 17, further comprising:
a third skimmer configured to contact the molten material in the second refining channel to pressure seal the third vacuum chamber from the fourth vacuum chamber.

19. The multi-stage vacuum housing in claim 17, further comprising:
a first wall configured to pressure seal the first vacuum chamber from the second vacuum chamber in combination with the first skimmer; and
a second wall configured to pressure seal the second vacuum chamber from the third vacuum chamber in combination with the second skimmer.

20. A multi-stage vacuum housing, comprising:
a first refining channel configured to flow molten material through a first vacuum chamber;
a second refining channel configured to flow the molten material through a second vacuum chamber;
a first skimmer configured to contact the molten material in the first refining channel;
a second skimmer downstream of the first skimmer and configured to contact the molten material in the first refining channel, wherein the first and second skimmers pressure seal the first vacuum chamber;
a third skimmer downstream of the second skimmer and configured to contact the molten material in the second refining channel; and
a fourth skimmer downstream of the third skimmer and configured to contact the molten material in the second refining channel, wherein the third and fourth skimmers pressure seal the second vacuum chamber.

21. The multi-stage vacuum housing in claim 20, further comprising:
a first wall configured to pressure seal the first vacuum chamber in combination with the first skimmer;
a second wall configured to pressure seal the first vacuum chamber in combination with the second skimmer;
a third wall configured to pressure seal the second vacuum chamber in combination with the third skimmer; and
a fourth wall configured to pressure seal the second vacuum chamber in combination with the foruth skimmer.

* * * * *